(12) United States Patent
Ahdoot

(10) Patent No.: US 9,464,566 B2
(45) Date of Patent: Oct. 11, 2016

(54) PLURAL BLADE ROTARY ENGINE

(71) Applicant: Ned M Ahdoot, Rancho Palos Verdes, CA (US)

(72) Inventor: Ned M Ahdoot, Rancho Palos Verdes, CA (US)

(*) Notice: Subject to any disclaimer, the term of this patent is extended or adjusted under 35 U.S.C. 154(b) by 253 days.

(21) Appl. No.: 13/987,425

(22) Filed: Jul. 24, 2013

(65) Prior Publication Data

US 2015/0337724 A1    Nov. 26, 2015

(51) Int. Cl.
*F02B 53/02* (2006.01)
*F01C 21/04* (2006.01)
*F04C 29/02* (2006.01)
*F04C 29/04* (2006.01)

(52) U.S. Cl.
CPC .............. *F02B 53/02* (2013.01); *F01C 21/04* (2013.01); *F04C 29/02* (2013.01); *F04C 29/04* (2013.01)

(58) Field of Classification Search
USPC ................................. 123/200, 204, 228, 244
See application file for complete search history.

(56) References Cited

U.S. PATENT DOCUMENTS

| | | | |
|---|---|---|---|
| 1,013,885 A * | 1/1912 | McConnel .................... 123/228 |
| 1,154,886 A * | 9/1915 | Richards ....................... 123/228 |
| 2,760,466 A * | 8/1956 | Black, Jr. ...................... 123/228 |
| 2,939,438 A * | 6/1960 | Bush ............................. 123/228 |
| 3,205,874 A * | 9/1965 | Renshaw ...................... 123/204 |
| 3,894,519 A | 7/1975 | Moran |
| 3,929,105 A | 12/1975 | Chisholm |
| 3,960,017 A | 6/1976 | Romanowski |
| 4,086,881 A | 5/1978 | Rutten |
| 4,137,890 A | 2/1979 | Wohl |
| 4,178,900 A | 12/1979 | Larson |
| 4,243,006 A | 1/1981 | Quiroga |
| 4,337,741 A | 7/1982 | McKenna et al. |
| 4,683,852 A * | 8/1987 | Kypreos-Pantazis ......... 123/228 |
| 4,741,164 A | 5/1988 | Slaughter |
| 4,890,990 A | 1/1990 | Zettner |
| 5,138,994 A | 8/1992 | Maday |
| 5,203,307 A | 4/1993 | Burtis |
| 5,404,850 A | 4/1995 | La Bell, Jr. |
| 5,979,395 A | 11/1999 | Breidenthal et al. |
| 6,776,136 B1 * | 8/2004 | Kazempour ................... 123/243 |
| 6,860,251 B1 * | 3/2005 | Reed ............................. 123/200 |
| 7,258,082 B2 * | 8/2007 | Huettlin ...................... 123/18 R |
| 7,305,963 B2 * | 12/2007 | Zak ............................... 123/228 |
| 7,893,369 B2 | 2/2011 | Wang |
| 8,151,759 B2 * | 4/2012 | Wright .......................... 123/228 |
| 8,424,505 B2 * | 4/2013 | Nagy ............................ 123/205 |
| 2002/0166535 A1 * | 11/2002 | DeFazio ....................... 123/200 |
| 2009/0120406 A1 * | 5/2009 | Lindsey ........................ 123/204 |
| 2010/0095926 A1 * | 4/2010 | Wright .......................... 123/228 |
| 2011/0107999 A1 * | 5/2011 | Murata ......................... 123/200 |
| 2013/0061828 A1 * | 3/2013 | Casey ........................... 123/200 |

* cited by examiner

*Primary Examiner* — Mary A Davis

(57) ABSTRACT

An apparatus to deliver rotation power to a shaft delivering mechanical rotation power, by a cavity that is formed by a spherical or cylindrical housing. A Rotor attached to a shaft, centrally rotating inside the housing along the center line of the rotation of the housing. A combustion chamber is formed inside the housing by a blade like Blocker and the blade like Rotor to ignition takes place. The ignition chamber expands radially providing rotational power to the shaft.

17 Claims, 13 Drawing Sheets

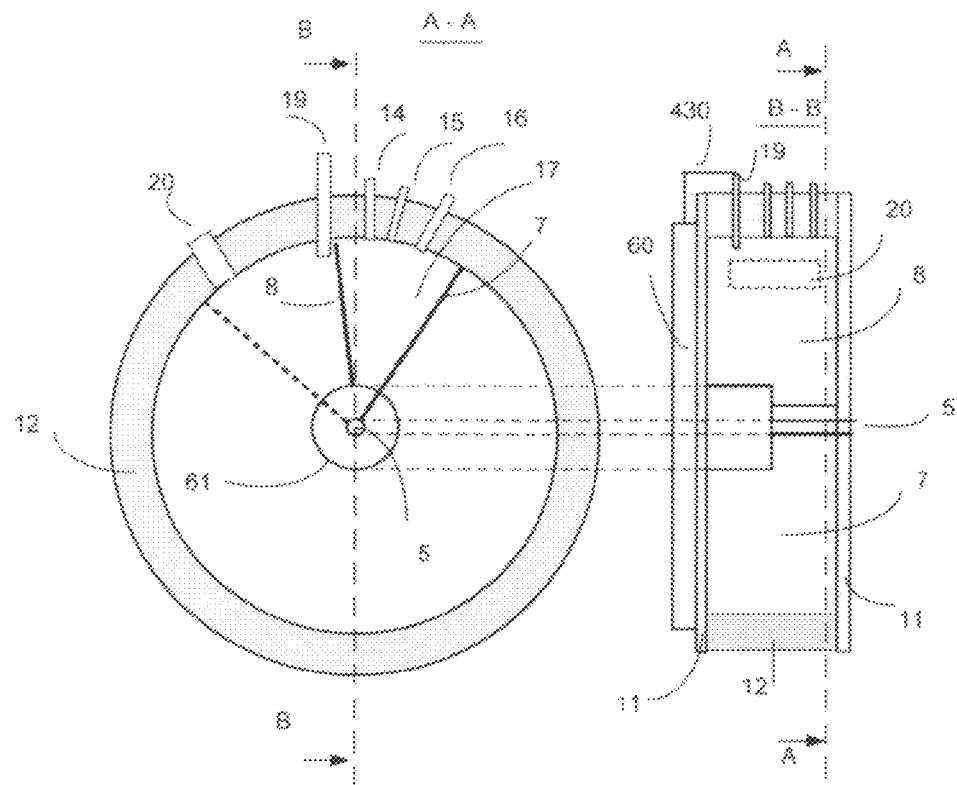
Fig. 2
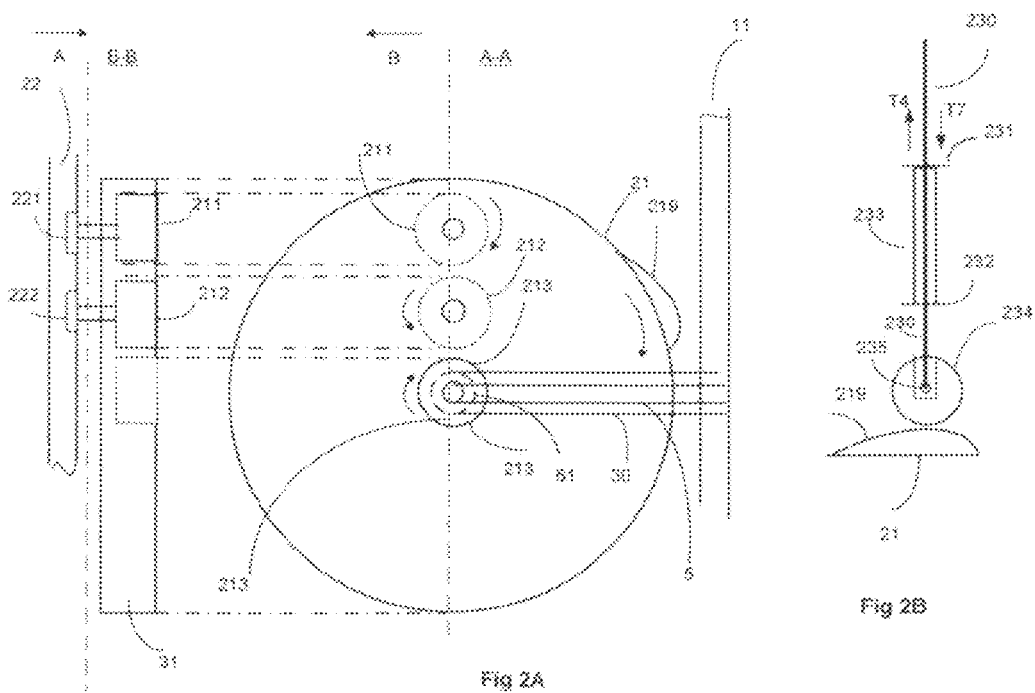
Fig 2A
Fig 2B

PLURAL BLADE ROTARY ENGINE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX", KMM

Not applicable.

BACKGROUND OF THE INVENTION

The related art outlined below discloses an apparatus for generating rotational powers to vehicles. However, the prior art fails to disclose the presently described rotary engine in which a Rotor rotates in a spherical or cylindrical housing in which the center of rotation of the Rotor is at a precise center of sphere or cylinder with minimal tolerances in deviation of the center of rotation of a shaft and the Rotor preventing frictions and wear and tear of the point of contact of the Rotor with the internal wall of the housing. This simple scheme of generating a compression chamber inside a spherical or cylindrical shape housing give rise to an efficient engine with minimum number of moving parts. In most cases, the existing art for a rotary combustion engine, essentially teaches us of a piston and cylinder in which a piston makes linear reciprocating motions inside a cylinder to deliver rotational power. The present disclosure distinguishes over the prior art providing heretofore unknown advantages as described in the following summary.

| | | | |
|---|---|---|---|
| 3,84,519 | 7/1975 | George Moran | |
| 3,929,105 A | 12/1975 | Chisholm | 123/205 |
| 3,960,017 | 5/1976 | Edwin Karmmerer | |
| 4,086,881 A | 12/197 | Chisholm | 123/205 |
| 4,137,890 A | 2/1979 | Wohl | 123/205 |
| 4,178,900 A | 12/1979 | Larson | 123/247 |
| 4,243,006 A | 1/1981 | Quiroga | 123/247 |
| 4,337,741 A | 7/1982 | McKena et al | 123/228 |
| 4,741,164 A | 5/1988 | Slaughter | 60/627 |
| 4,890,990 A | 1/1990 | Zettner | 418/1 |
| 5,138,994 | 11/1992 | Laszlo Maday | |
| 5,203,307 | 4/1993 | Wilson Burtis | |
| 5,404,850 | 4/1995 | La Bell | 123/263 |
| 5,979,395 A | 11/1999 | Mallen et al. | 123/243 |
| 7,893,369 B2 | 2/2011 | Yang Wang | |

BRIEF SUMMARY OF THE INVENTION

A primary objective inherent in this new invention of Circular Rotary Turbo Internal Combustion Engine is description of an apparatus and method not taught by the prior art. The engine consists of a cavity that is formed by a spherical or cylindrical housing. A Rotor attached to a shaft, centrally rotating inside the housing along the center line of the rotation of the housing. A combustion chamber if formed inside the housing by a blade like Blocker and the blade like Rotor in which ignition takes place, and the ignition chamber expands radially providing rotational power to the shaft. Other features and advantages of the present invention will become apparent from the following more detailed description, taken in conjunction with the accompanying drawings, which illustrate, by way of example, the principles of the presently described apparatus and method of its use.

BRIEF DESCRIPTION OF FIGURES

FIG. 2: is the second embodiment of the Circular Rotary Turbo Internal Combustion Engine.

FIG. 2A: is the schematic of gear and timing assembly for the second embodiment of the engine.

FIG. 2B: is the schematic of method of activating the Blocker for the second embodiment of the engine.

FIG. 6A: is the schematic for the implementation of two cycles suction and compression pumps for fuel, water or oil in which a storage tanks are shown.

ADVANTAGES OF THE INVENTION

Figure 1:
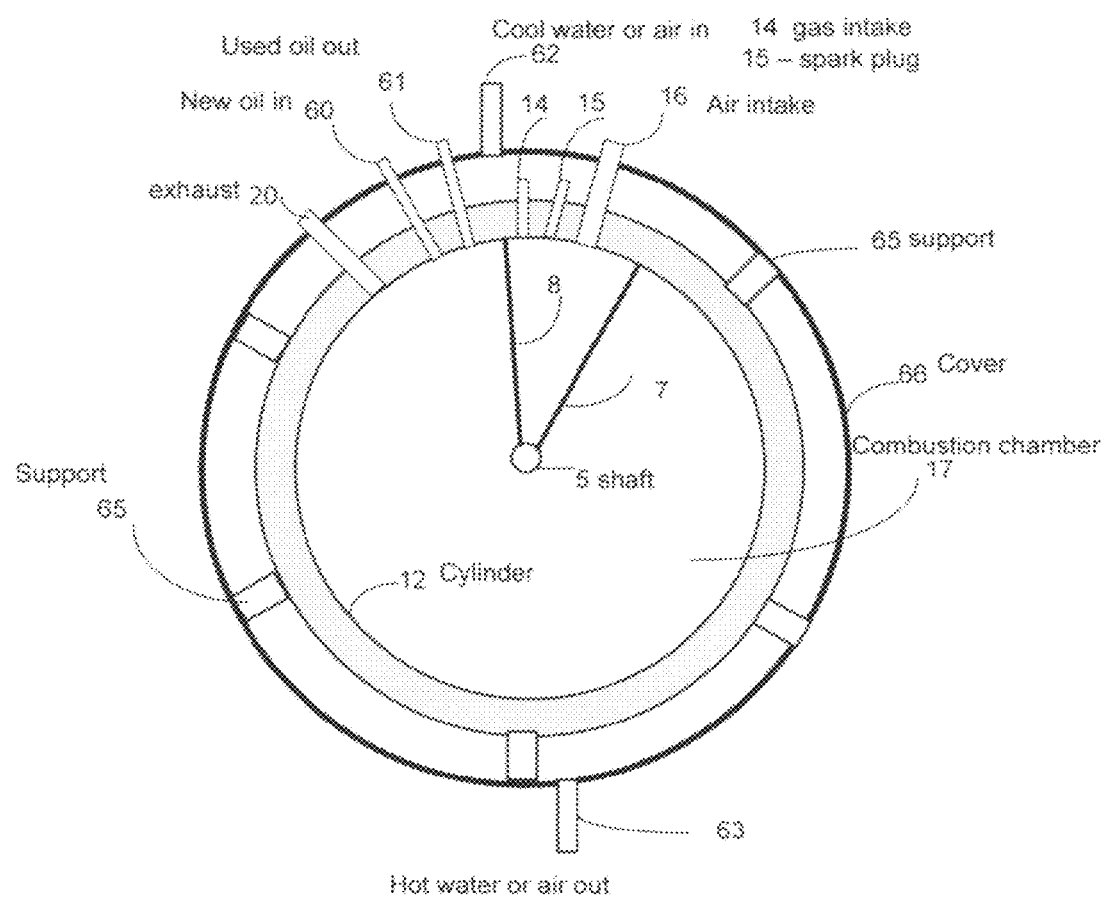
FIG. 1: is the embodiment of the Circular Rotary Turbo Internal Combustion Engine including the cylindrical housing and the cover of the engine.

The invention differs from most of the previous art internal combustion engine in which the combustion chambers expand radially Unlike the present art, this invention provides expansion of combustion chamber between a blade like Rotor that is directly attached to the shaft and extended outward towards the inner surface of the housing of a cavity, and radially rotating inside the cavity. A combustion chamber is formed between a Rotor attached to a shaft and a blade like Blocker, making temporary transitional motions to form a barrier inside the cavity and form a combustion chamber. The combustion chamber is formed between the Blocker and the Rotor during combustion time, the Blocker remains stable and the Rotor rotates radially forcing the shaft to move with it.

This is a radical difference between the original Wankel rotary engine. The Wankel's rotation of the Rotor is in an elliptical housing and the center of rotation consists of a set of gears to guide the motion in a elliptical cavity. In the most recent patents of so called rotary engines, a reciprocating piston and cylinder configurations is used for combustion chamber and expansion of ignited gas.

The Wankel engine housing for the generation of pressured air and combustion of pressured air and gas is elliptical. Elliptical housing for the rotor is one of the sources of problems including the frictions between the housing and the rotor.

In order for the elliptical motions to take place, the shaft is connected to series of gears for the elliptical rotations. Generation of elliptical rotation through gear system is the cause and a major contributor of friction. By comparison:

This invention resorts to a circular housing in which the shaft rotates in a center of the circular housing eliminating the requirements of elliptical motions and the necessity of gear system.

The Rotor is a blade rotating in a spherical or cylindrical housing along the centerline of the housing resulting in minimal deviation in tolerances of the point of contact between the edge of the Rotor and the housing.

Minimal tolerance variations avoids severe loading (pressure) between the edges of the Rotor and the internal walls of the housing, preventing frictions and wear and tear.

The centrifugal force of the rotor in Wankle engine, the variation of tolerances acts as a hammering force destroying the tip of the rotor and the housing.

The Blade shape Rotor and the Blocker provides for greater combustion chambers volumes within the cavity compared to Wankel engine's triangular shape rotor (for the same size volume of an engine). This increase in volume of the combustion, results in greater torque and rotational output power.

Far smaller number of moving parts allows the engine to be built economically with advantage of greater efficiency in terms of conversion of gas to heat.

Far lower frictions for eventual higher miles per gallon of gas.

Far lower maintenance cost.

Different option implementation for the type of engine allows:

The design allows for the air compression to be implemented within the same cavity or external air suction and pump to be implemented in parallel with combustion cavity injecting pressured air before ignition.

Combinations of air suction and air compression pump provides a rich mixture of oxygen for powerful turbo engine.

Three different implementation of the Blocker allows for different types of engines with respect to their usages.

Turbochargers and superchargers are fans that force compressed air into an engine's said cavities. Fans in this case are always open at the air intake side and thus will not produce a high pressure compressed air. That is why they are huge for race car engines.

Bigger and more powerful engines will be built by enlarging the volume of the cavity and larger radiuses of the cylindrical shape housing. This will eliminate the need for multi piston and cylinders, reducing the number of moving parts and manufacturing costs.

In the present piston and said cavity engines, crankshafts occupy a major portion of the engine volumes. They are not gear driven and they operate under heavy load. The crankshafts are the sources of friction and generation of heat for eventual failure. This invention does not require crankshaft. A small timed gear assembly is used to activate the Blocker to let the Rotor to pass for no friction.

The present engine crankshafts operate under a heavy load. They require constant and heavy cooling and lubrication accessories adding more weight to an engine. Due to far lower frictions and moving parts of this invention, the need for lubrication and cooling are far smaller.

Due to far less moving parts, friction and heat generations, this invention, allows an air cooling system, that is sufficient for cooling an engine with less moving parts and frictions compared to water cooling, further reducing weight and cost of manufacturing of an engine.

Crankshaft are build heavy to bear the load for the actual motion of a vehicle. The heaviness adds to the size and weight of an engine. The present invention provides for a blade like Rotor and Blocker in which the size and weight are insignificant compared to a crankshaft.

This invention provides for a dual cycle compressed air pump eliminating an open end air intake side of present turbocharge engines. The same concept of cavity along with a Rotor and Blocker provides for suction and compression pumps that:

a. A compressed air is injected into the combustion chamber yielding more power output from the combustion chamber.

Most turbocharged engines us an oversized open end fan to force pressure air into the combustion chamber.

b. The suction and compression capability of a pump allows greater freedom in design of engines wherein the source and destination of gas or liquid (to and from the engine) will be irrespective of their locations in the vicinity of the combustion chamber.

Other features and advantages of the present invention will become apparent from the following more detailed description, taken in conjunction with the accompanying drawings, which illustrate, by way of example, the principles of the presently described apparatus and method of its use.

DETAILED DESCRIPTION OF THE INVENTION

Referring now to FIG. 1, for the description of first embodiment of a circular rotary turbo internal combustion cavity with an in out motion of the Blocker. It depicts a cylinder housing (12) with a shaft (5) along the centerline of the cylinder. Shaft (5) rotates in the linear center of the cylinder (12). Attached to the shaft (5) is a Rotor (7), rotating radially with the shaft. A semi stationary Blocker blade (8), getting inserted in and out of the cylinder through a slot in the body of the housing. Blocker blade (8) driven in and out by a gear assembly (40) that is situated outside the cylinder in parallel with the face and covering of the cylinder (11). Attached to the said cavity are fuel injection valve (14) air injection valve (15) spark plug (16) and fuel exhaust (20). The gear assembly (40) is synchronized to the shaft (5), forcing timed insertion, and retraction of the Blocker blade (8) inside the cylinder housing (12).

A variable volume combustion chamber (17) is formed between the Blocker blade (8) and the Rotor (7). At the start of a combustion cycle, powered fuel enters via the fuel injection valve (14) and pressured air enters via air injection valve (15) that are injected directly into the compression chamber (17) and then the spark plug (16) introduces and electrical spark to ignite the mixture. During the ignition, while the Blocker is inside the said cavity, the blast forces the Rotor (7) forward, while the Blocker (8) is stationary inside the housing (12). The forced rotation of shaft (5) continues until the ignited fuel is escaped from the exhaust (20). At the moment of ignition, the combustion chamber is small and is filled with mixture of pressured air and fuel. The ignition forces the Rotor (7) forward, rotating the shaft and thus provide rotational power for motion of a vehicle. The fuel injection valve (14) and spark plug (16), each located at proper phase with respect to the rotation of the shaft (5). At the end of the combustion expansion, the exhaust opening (20) lets the exhaust fuels out and the Blocker blade is retracted to let the Rotor (7) to pass.

The combustion chamber (1) is covered by the housing (66) in which the support studs (65), supports the said cavity inside the housing. Attached to the housing cover are provisions to let cold water/air in (61) and cold water/air out (63). The Other connections to the housing are clean oil in (60), used oil out (61)

Figure 1A:
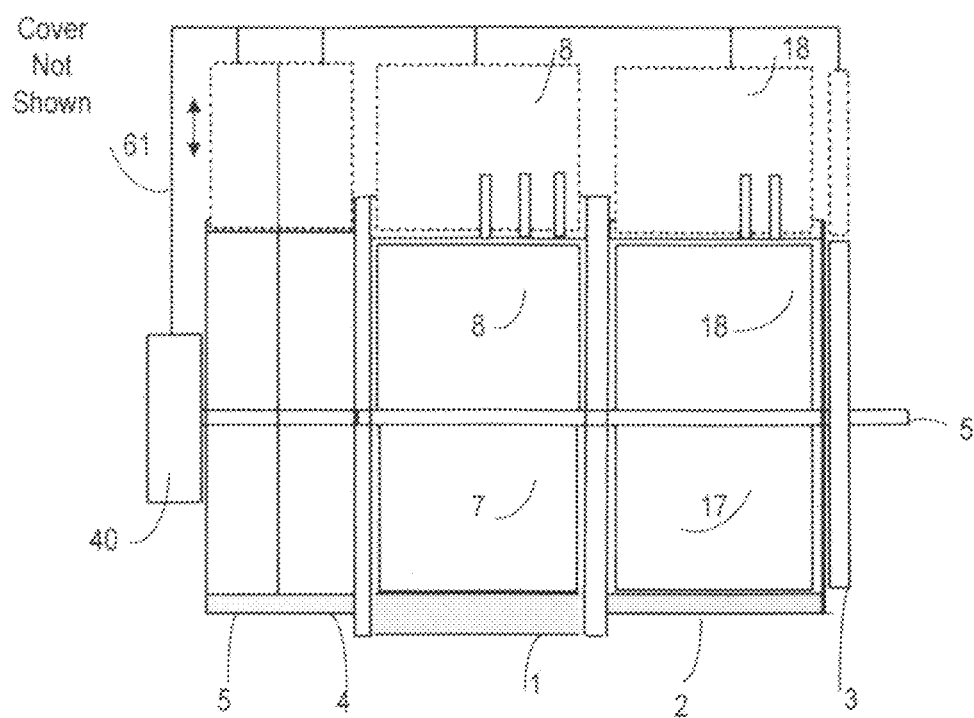
FIG. 1A: is the embodiment of a complete Circular Rotary Turbo Internal Combustion Engine illustrating air, water, oil, gas suction compression pumps.
Figure 1B:
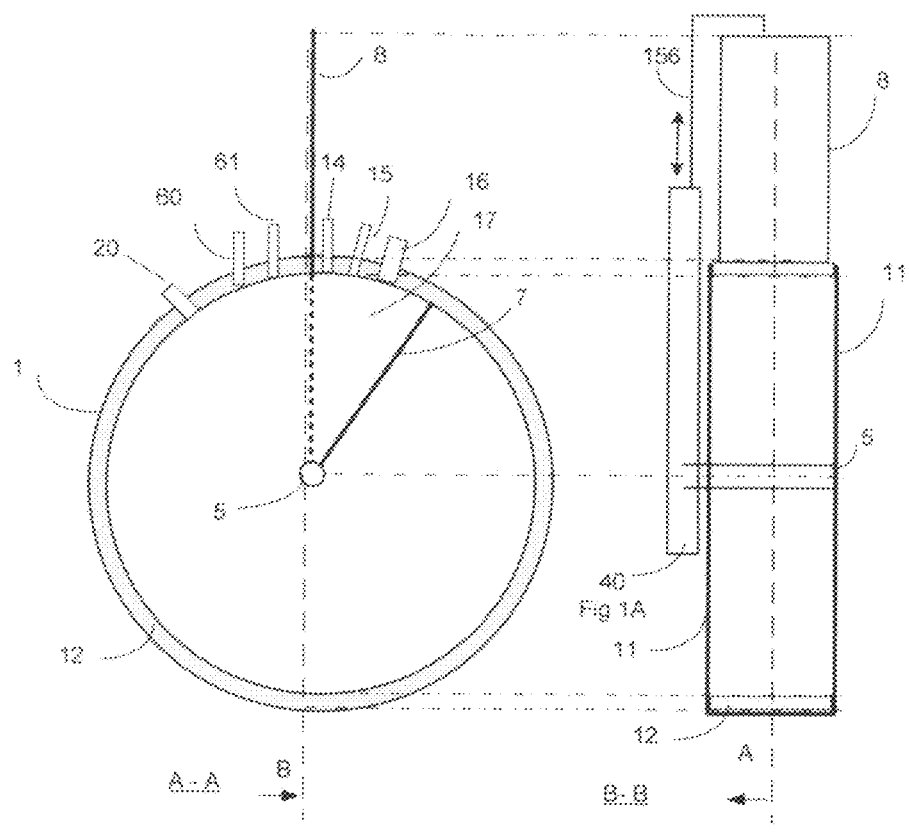
FIG. 1B: is the first embodiment of the Circular Rotary Turbo Internal Combustion Engine.

Referring now to FIG. 1B for the description of the complete circular rotary internal combustion engine consisting of combustion chamber (1), air pump (2), fuel pump (3), water pump (4) and oil pump (5), which are all driven by the shaft (5).

Embodiment 1

Referring now to FIG. 1B for the description of a circular turbo rotary internal combustion engine (1). It depicts a housing (12 for the cavity, with the center of the rotation of the shaft (5) rotates in the center of said cavity housing (12). Attached to the shaft (5) is a Rotor (7), rotating radially with the shaft. A semi stationary Blocker blade (18), getting inserted in the said cavity through an slot with the face of the blade (18) in parallel with the centerline of shaft (5) driven by a gear assembly (40) that is situated outside the said cavity in parallel with the face of the said cavity (11). Attached to the said cavity are fuel injection valve (14) air injection valve (15) Spark plug (16) and fuel exhaust (20). The gear assembly (40) is driven by the shaft 5, forcing timed insertion, and retraction of the Blocker blade (8) inside the said cavity housing (12).

A variable volume combustion chamber (17) is formed between the Blocker blade (8) and the Rotor (7). At the start of a combustion cycle, powered fuel (14) and pressured air (15) is injected directly into the compression chamber (17) and then the spark plug (16) introduces and electrical spark to ignite the mixture. During the ignition, while the Blocker is inside the said cavity, the blast forces the Rotor forward, while the Blocker is stationary inside said cavity housing (12). The forced rotation of shaft (5) continues until the ignited fuel is escaped from the exhaust (20). At the moment of ignition, the combustion chamber is small and is filled with mixture of pressured air and fuel. The ignition forces the rotor forward, rotating the shaft and thus provide rotational power for motion of a vehicle. The fuel injection valve (14) and spark plug (16), each located at proper phase with respect to the rotation of the shaft (5). At the end of the combustion expansion, the exhaust opening (20) lets the exhaust fuels out and the Blocker blade is retracted to let the Rotor (7) to rotate.

Figure 1C:
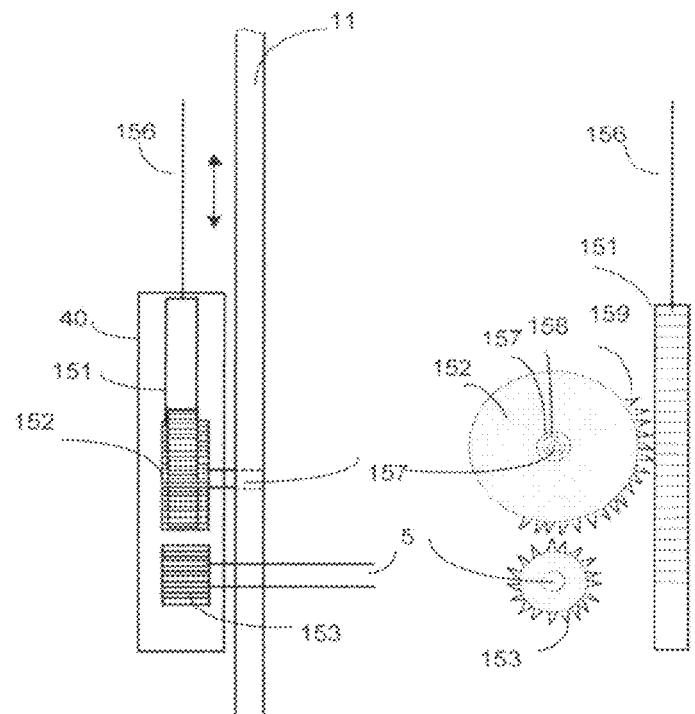
FIG. 1C: is the schematic of gear and timing assembly for the first embodiment of the engine.

Referring now to FIG. 1C that shows the gear assembly (40) attached to the side of the cylinder covering (11). The timed gear assembly is a rack and pinion type for converting circular motion to linear motion for insertion and extraction of the Blocker (8) from the cylinder. It is consisting of gears (153), (152), a blade like device with groves (151) and a spring (158) to provide the Blocker blade's (8) reciprocating motions. Gear (153) is attached to the shaft (5) and rotates with it. A larger gear (152) centrally connected to the engine said cavity cover (11) is rotated by gear (153). Gear (152) is partially covered by teeth (159) for the teeth to retract the Blocker blade (8) from cylinder housing (12). For the angle in which gear (152) is without teeth, the two gears are not in contact and the spring (158) forces the gear (152) back to the original position of insertion into the cylinder ready for the next combustion cycle.

Figure 1D:
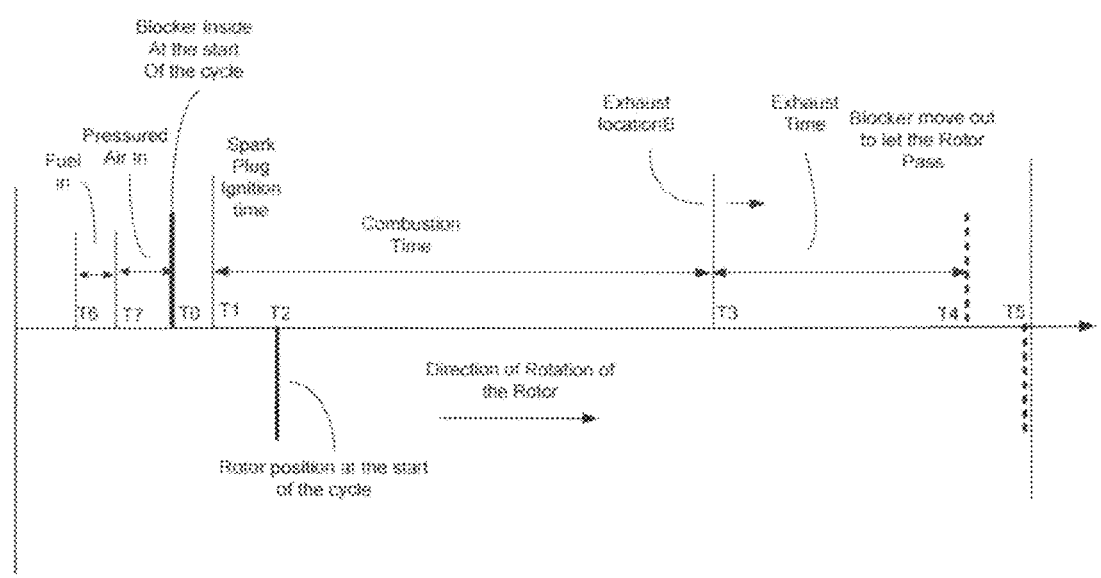
FIG. 1D: is the schematic of timing of the gear assembly for the activation of Blocker with respect to the Rotor.

Referring now to the FIG. 1D, which is the timing diagram of the motions of the Rotor and Insertion Blocker. The details are explained within the diagram which is self-explanatory.

Embodiment 2

Referring now to FIG. 2 for the second embodiment of the circular turbo internal combustion engine, which is similar to FIG. 1B. It consists of a cylinder shape housing (12), wherein the center of the rotation of the shaft (5) rotates in the center of cylinder housing (12). Attached to the shaft (5) is a blade like Rotor (7), rotating radially with the shaft. A semi stationary rotational Blocker blade (8) attached to tube like device, second shaft (61) that is driven by (60), rotating freely with respect to the shaft (5) and driven by a gear assembly (60) that is situated outside the cylinder in parallel with the area of the cylinder. Attached to the cylinder are fuel injection valve (14) air injection valve (15) Spark plug (16) and fuel exhaust (20). The gear assembly (60) is driven by the shaft (5), forcing timed radial motion of a Blocker (8) inside the cylinder housing (12).

A variable volume combustion chamber (17) is formed between the Blocker (8) and rotor (7). At the start of a combustion cycle, powered fuel (14) and pressured air (15) in introduced to the compression chamber (17) and then the spark plug (16) introduces and electrical spark to ignite the mixture. During the ignition, the blast forces the Rotor forward while the Blocker is stationary until the ignited fuel is escaped from the exhaust (20). In the remaining time of the complete cycle, the Blocker moves with faster speed behind the Rotor to get stopped again by the stopped pin (19). The Blocker (8) always trails the rotor (7) to get stopped after the stop pin (19) is inserted into the cylinder. The Rotor passes the stop pin (19) while the stop pin is pulled out and then the Blocker is stopped by the stop pin (19) driven by timer gear assemble (60). At the moment of ignition, the combustion chamber is small and is filled with mixture of pressured air and fuel. The ignition forces the rotor forward, rotating the shaft and thus provide rotational power for motion of a vehicle. The fuel injection valve (14) and spark plug (16), each located at proper phase with respect to the rotation of the shaft (5). At the end of the combustion expansion, the exhaust opening (20) lets the exhaust fuels out.

Referring now to FIG. 2A, for the description of the timed gear assembly (60) for the second embodiment. The shaft (5) is extended from the combustion engine (1) and is connected to the large gear (21). Gear (21) activates three other gears (211), (212) and (213) respectively. Gear (213) is connected to a second shaft (61) that centrally rotates around the main shaft (5). The second shaft (61) is connected to the Blocker (8) to provide its motions with proper speeds (that is faster than the speed of the Rotor (5)). Gears (212) and (211) are centrally attached and rotate with respect to the stationary engine block (22) that supports their rotations with ball bearings (221) and (222).

Referring now to FIG. 2B for the description of the timed stoppage assembly, in which a small hump (219) is attached on top of the large gear (21) for activation of the stoppage rod (230). The position of the hump (219) on the large gear is adjusted to retract the stoppage pin (19), from the cylinder for the Rotor to pass. A ball bearing (234) that is attached to the rod (230), allows the rod to insert and retract the stoppage pin (19) in the combustion chamber (17). A spring (233) with one side connected to the rod (230) via (233) and the other side connected to the engine block (22) via (231) will further guide the motions.

Figure 2C:
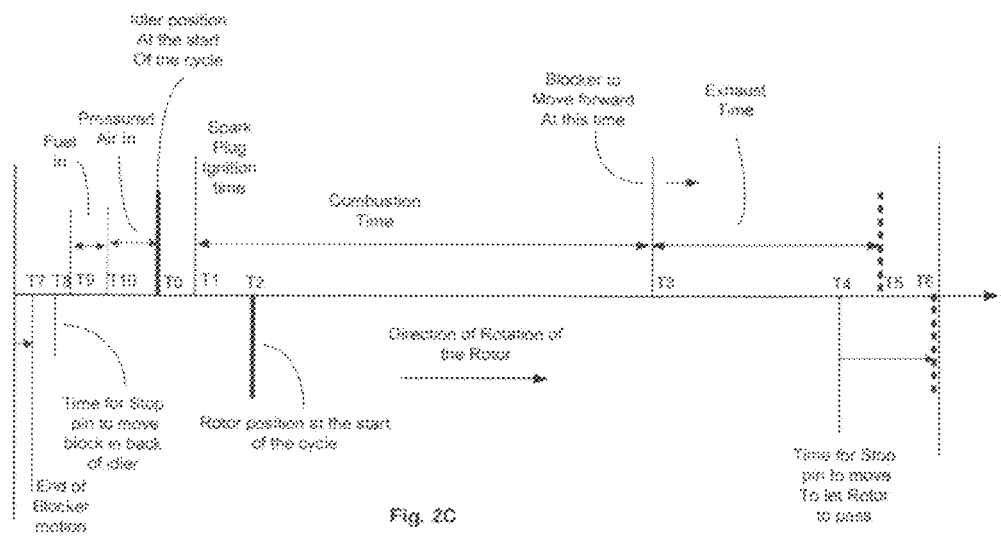
FIG. 2C: is the schematic of timing of the gear assembly for the activation of Blocker with respect to Rotor.

Referring now to FIG. 2C, for description of relative timings of the Rotor (7), Blocker (8), and Stoppage pin (19) relative to the shaft (5). It is important to remember that the Rotor is constantly moving and the Blocker is stationary at one location for approximately 270 degrees of the motions of the Rotor. It start moving (behind the Rotor), during the 90 degree remaining time from the stoppage position, for it to get in stop position again. During the 90 degree time period, the stoppage pin retracts to let the Rotor and the Blocker to pass and start the cycle again. The timing FIG. 3C shows the rotations of the Rotor, stationary position of Blocker, injection of fuel, injection of the pressured air and ignition by the spark plug. For reference, the end of the period in which the pressured air is injected into the ignition chamber (the area between the Blocker and the rotor (17), is set as TO.

Embodiment 3

Figure 3:
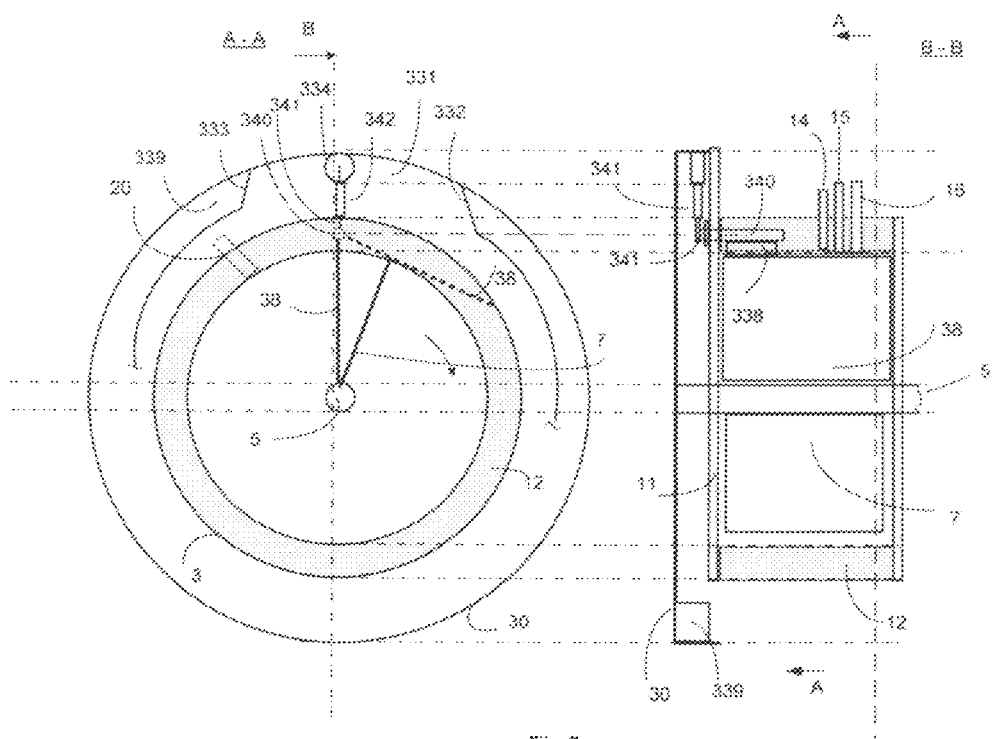
FIG. 3: is the third embodiment of the Engine Circular Rotary Turbo Internal Combustion.

Referring now to FIG. 3, for the third embodiment of the circular turbo rotary internal combustion engine (1) for a butterfly Blocker method. It depicts a cylinder shape housing (12), with the shaft (5) centrally rotates in the center of cylinder housing (12). Attached to the shaft (5) is a Rotor (7), rotating radially with the shaft. A semi stationary butterfly Blocker (38) getting circularly inserted in the cylinder (for the duration of the time that combustion is taking place and retracted to let the Rotor pass), through the housing of the cylinder housing (12), or a small housing attached to (12). The center line of rotation of the butterfly Blocker is in parallel with the shaft (5). The butterfly Blocker (38) IS driven by a gear assembly external to the cylinder housing (12). Attached to the cylinder are fuel injection valve (14) air injection valve (15) Spark plug (16) and fuel exhaust (20). The gear assembly is driven by the shaft 5, forcing timed insertion, and retraction of the butterfly Blocker blade (38) inside the cylinder housing (12).

A variable volume combustion chamber (17) is formed between the Blocker blade (38) and rotor (7). At the start of a combustion cycle, powdered fuel (14) and pressured air (15) is injected to the compression chamber (17) and then the spark plug (16) introduces and electrical spark to ignite the mixture. During the ignition, while the Blocker is inside the cylinder, the blast forces the Rotor forward while the Blocker is stationary until the ignited fuel is escaped from the exhaust (20). At the moment of ignition, the combustion chamber is small and is filled with mixture of pressured air and fuel. The ignition forces the rotor forward, rotating the shaft and thus provide rotational power for motion of a vehicle. The fuel injection valve (14) and spark plug (16), each located at proper phase with respect to the rotation of the shaft (5). At the end of the combustion expansion, the exhaust opening (20) lets the exhaust fuels out and the Blocker blade is retracted to let the Rotor (7) to rotate.

Figure 3A:
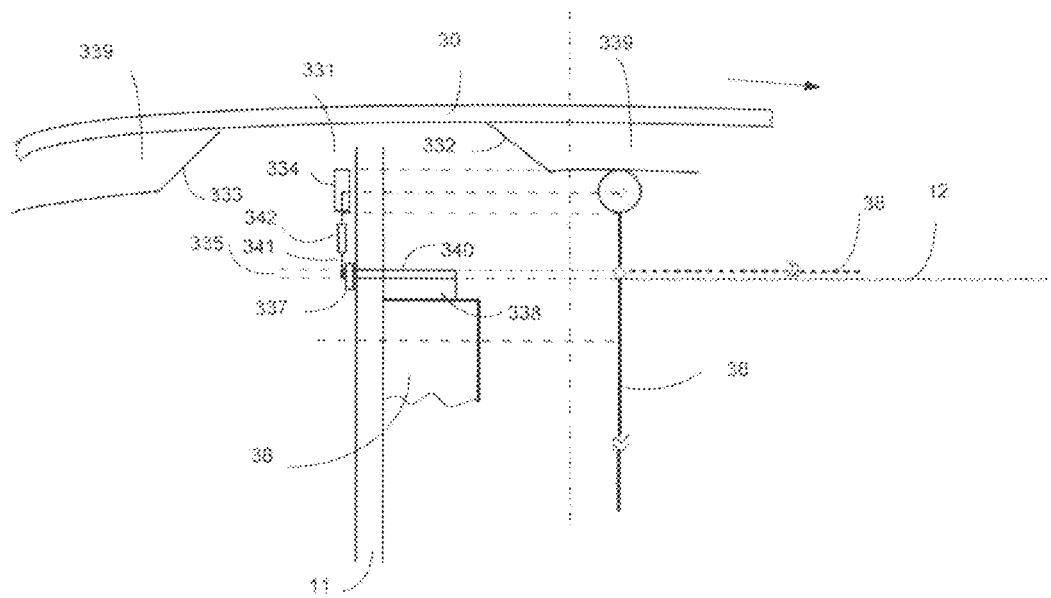
FIG. 3A is the schematic of gear and timing assembly for the third embodiment of the engine for the activation of the Blocker with respect to the Rotor.

Attached to the side of the cylinder housing (12) is provisions of the gear assembly FIG. 3A for the butterfly Blocker. A circular plate (30) attached to the shaft (5) rotates with the shaft outside cylinder housing (12). The butterfly Blocker is attached to the cylinder housing (12) (or a small housing connected to (12)), with the center of rotation at (340) in which the line of rotation is in parallel with the shaft (5).

Referring now to FIG. 3A, when the round plate (30) rotates, its edges are equipped with two segments of (331) and (339). Segment (339) is a round edged semi-circle band in which the outside radius of the band has the same radios of plate (30) and the inside radios of the band is smaller than outer radius. When the plate (30) rotates, the ball bearing (334) makes contact with outer radius of (30) edges or with the inner radius of the band (339). Band (331) is for the portion of the cycle time in which the butterfly Blocker needs to be in closed state inside the cylinder, and no contact during the portion of the cycle time (331). A spring (342) connected to the rod (341) will force the ball bearing (334) to be in contact with either (331) OR (339). When a ball bearing (334) passes near the edge of the band (332), it inserts the butterfly Blocker (38) inside the cylinder and keeps it there till it reaches the edge (333), in which the Blocker (38) is retracted to the side of the cylinder to let the Rotor pass. During the (331) cycle timing a spring (337) forces the rod (340) to get the butterfly Blocker out of the cylinder housing (12) for the Rotor (7) to pass.

1—Single Cycle Compression Pumps.

Figure 4:
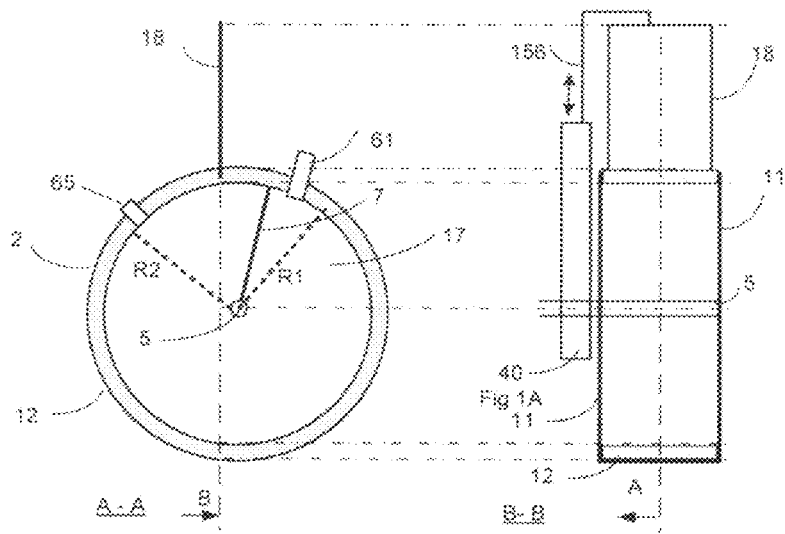
FIG. 4: is the third embodiment of the Circular Rotary single cycle suction and compression pump.

Referring now to FIG. 4 that depicts a single cycle Compression pump, which is driven by the shaft (5) and a common gear assembly (40) activating both (7) and (18). The air pressure pump works in synchronization with the combustion chamber (1) to deliver pressured air into the combustion chamber (17) at exact timing of the combustion timing period. Note that in the combustion engine, combustion chamber is formed between the Blocker (8) and the Rotor (7). The compression is formed between the Rotor (7) and the Blocker (18). The mechanical construction is similar to the combustion chamber (17) with the same timing gear assembly as in FIG. 1C. The exception is that the valves (14), (15) and (16) are replaced with the air opening (61) and air compression out valve (65). At the start of the cycle, the air already is pushed in into the compression chamber (17). When the Rotor (7) passes the ambient air opening (61) the air will get compressed in front of the R1 while air is sucked in back of in front of the R1. When the Rotor R2 is near the pressured air outlet (61), the pressured air is injected into the combustion chamber (7) via diode valve 65 in time ready for combustion process.

Figure 4A:
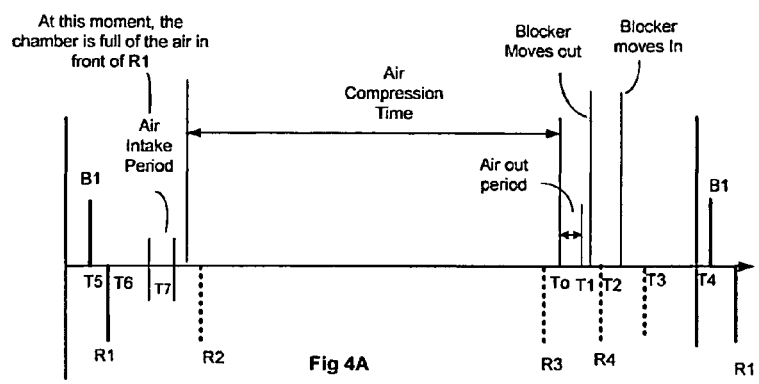
FIG. 4A: is the schematic of the timing of the first embodiment of the Circular Rotary single cycle suction and compression pump.
Figure 4B:
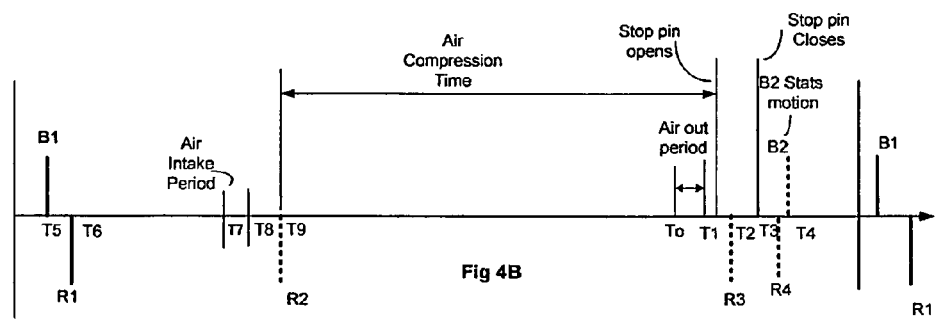
FIG. 4B: is the schematic of the timing of the second embodiment of the Circular Rotary single cycle suction and compression pump.

Referring now to FIGS. 4A and 4B that exhibit the phased timed actions of both compressor and the combustion chamber, both driven by the gear assembly (40).

2—Two Cycle Blocker Air compression

Figure 4C:
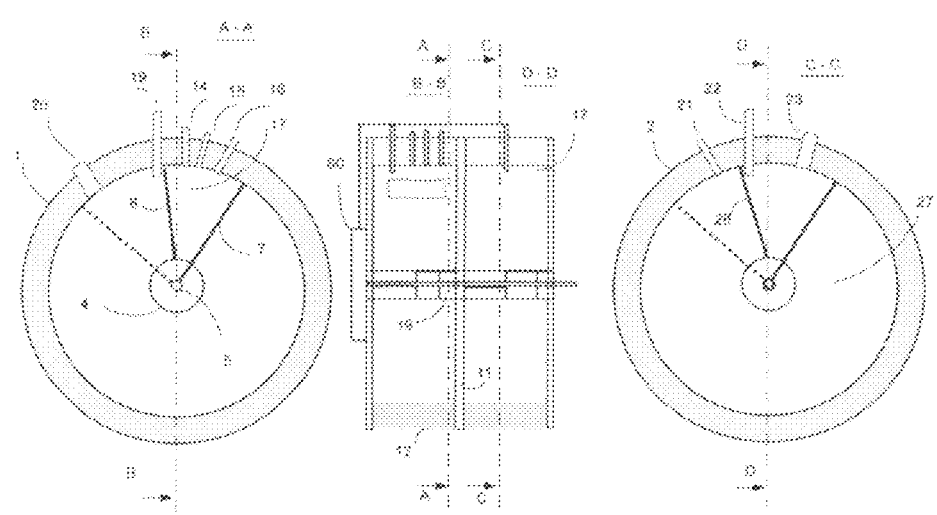
FIG. 4C: is the schematic of the second embodiment of the Circular Rotary Turbo Internal Combustion Engine including the single cycle air pump.

Referring now to FIG. 4C, a schematic for describing a combustion chamber (1) a single cycle air pressure pump (2) both using the cycle Blocker described in embodiment 2.

The single cycle air pressure generation pump (2), a Rotor (27) connected to the shaft (5) and a Blocker (28) connected to a the second shaft (4) extended from combustion engine (1), the second shaft (4) rotates freely around the shaft (5) and does not move unless it is driven by gear assembly box (60) that is synchronized to shaft (5). It also includes an air pressure inject diode (21), a stoppage pin (22) and an intake air opening (23)

A variable volume compression chamber is formed between the Blocker (28) and rotor (27), the Blocker (28) trails the rotor (27) and gets stopped at a rotation angle with respect to the rotation of the shaft to provide a timed barrier for the Blocker to be stopped and the rotating Rotor. An air compression chamber (27) is formed between the Blocker at the time that is stopped from moving and the Rotor that is moving towards the Blocker to pressurize air, an air pump. At the moment of compression start, the compression chamber is filled with ambient air with the opening (23). The Blocker is stopped by the stoppage pin (22) from moving forward. The Rotor (27) rotates forward, compressing the air. By the time that the Rotor passes the air intake, the Blocker has to get to the stop pin to start the air compression. The time for acceleration and motion of the Blocker is from the time that the pressured air is forced out through the one way diode 21 to the time that the Rotor has just moved out of the air intake opening 23. The important point is to remember that at the start of the Blocker motion, the rotor is very close to the air inject out (21), and the Stoppage blocking pin 22 is moved up and out of the way of Blocker and the Rotor to pass through.

Engine Embodiment 4

Figure 5:
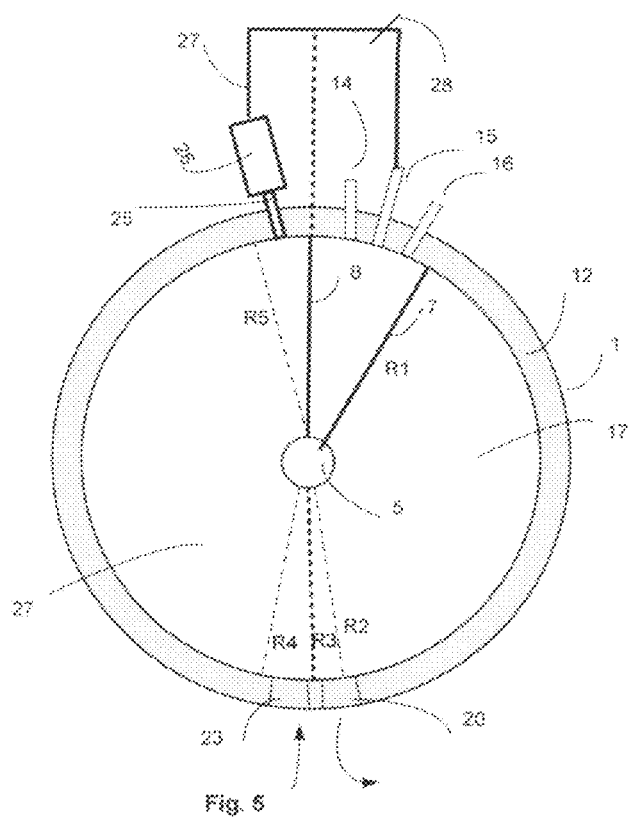
FIG. 5: is the fourth embodiment of the Circular Rotary Turbo Internal Combustion Engine for single cycle compression and combustion in a cavity.

Referring now to FIG. 5, for, for the fourth embodiment of a combustion and air compression in a single cylinder during a single cycle. It depicts a cylinder shape housing (12), in with the center of the rotation of the shaft (5) rotates in the center line of cylinder housing (12). Attached to the shaft (5) is a Rotor (7), rotating with the shaft. A semi stationary Blocker blade (8), getting inserted in the cylinder through an slot with the face of the Blocker (8) in parallel with the center line of shaft (5) and driven by a gear assembly (40) that is situated outside the cylinder in parallel with the covering plate of the cylinder (11). Attached to the cylinder are fuel injection valve (14) air injection valve (15) Spark plug (16) and fuel exhaust (20). The gear assembly (40) is driven by the shaft (5), forcing timed insertion, and retraction of the Blocker blade (18) inside the cylinder housing (12). An air pressure chamber (27) is formed between the Rotor (7) and Blocker (8). A tank 26 (covered in details in two cycle compression pumps to follow) is added to inject pressured air into the combustion chamber (17) through the air lines (25) and (27). A controlled valve (28) is inserted between the air pressure tank (27) and air pressure valve (16) for proper injection of air into the compression chamber (17).

A variable volume combustion chamber (17) is formed between the Blocker blade (8) and rotor (7). At the start of a combustion cycle, powdered fuel (14) and pre-pressured air that is the result of the previous cycle air compression chamber (27). An electrical spark is introduced by the spark plug (16) to spark and ignite the mixture. During the ignition, while the Rotor rotates inside the cylinder, the blast forces the Rotor (7) forward while the Blocker (8) is stationary. It continues until the ignited fuel is escaped from the exhaust (20). At the moment of ignition, the combustion chamber is small and is filled with mixture of pressured air and fuel. The ignition forces the rotor forward, rotating the shaft and thus provide rotational power for motion of a vehicle. The fuel injection valve (14) and spark plug (16), each located at proper phase with respect to the rotation of the shaft (5). At the end of the combustion expansion, the exhaust opening (20) lets the exhaust fuels out. An ambient air opening has already filled the compression chamber (27) ready for it to be compressed. When the Rotor passes the air opening (23), the ambient air is already trapped in the compression chamber (27) and it gets pressured in the compression chamber (27). Before the end of the cycle, when the Rotor reaches the pressured air outlet 25, it forces the pressured air into the pressured air tank (26), ready for the start of the next cycle, to get injected into the compression chamber (17). The Blocker blade (8) is retracted to let the Rotor (7) to pass.

Figure 5A:
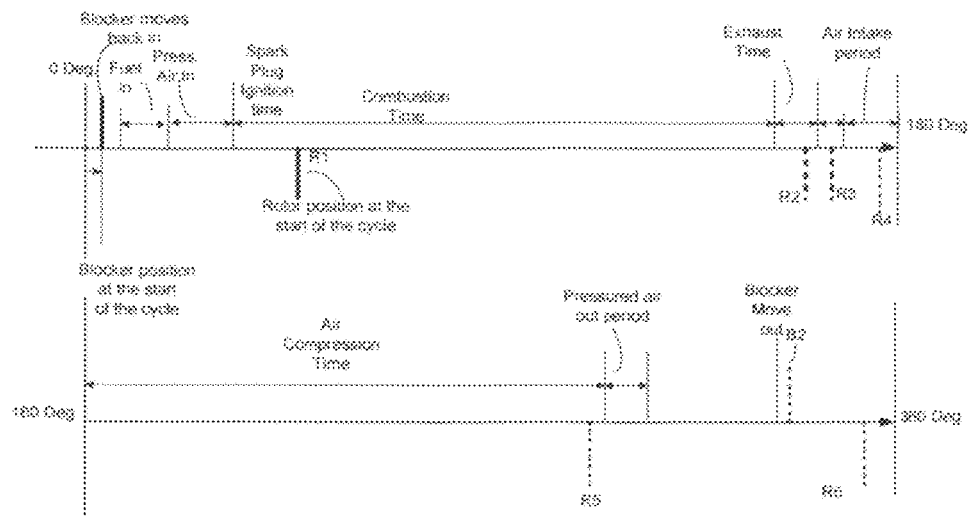
FIG. 5A: is the schematic of timing for gear assembly for the fourth embodiment of the engine.

Referring now to FIG. 5A, for the description of timing related to the combustion chamber and compression chamber of FIG. 5. At the start of the cycle (Zero degree), The Blocker is inside the cylinder, and compressed air is introduced inside the chamber which is in back of the R1 position. When Rotor R2 passes the exhaust chamber (20), the exhaust fuel is sent to the muffler. During the previous cycle the ambient air is sucked into the compression chamber (27). This takes place while the Rotor moves from R4 to R5. At the time R4 position the ambient air is in front of the R4 and is compressed when it reaches R5 position. The pressured air is injected in the pressure tank, ready to get injected in the next cycle into the combustion chamber (17). During the time of R5 to R6, the Blocker moves out of the cylinder to let the Rotor pass, ready for the next cycle.

Engine Embodiment 5

Figure 5B:
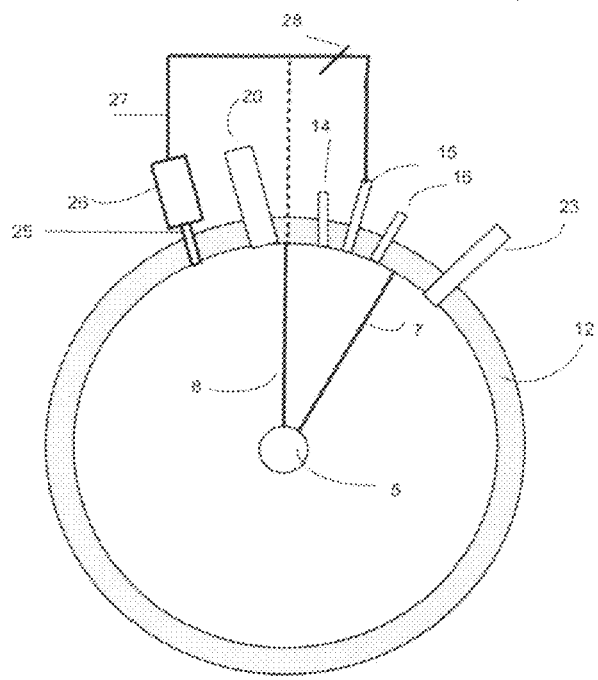
FIG. 5B: is the fifth embodiment of the Circular Rotary Turbo Internal Combustion engine for two cycle compression and combustion in a cavity.

Referring now to FIG. 5B for a circular turbo rotary two cycle internal combustion engine in a fifth embodiment for a dual cycle compression and combustion in single cylinder housing. One cycle is designated for air compression and the second cycle for combustion of mixed gas and pressured air. The difference is that the compression chamber (17) and the combustion chamber (27) of FIG. 5 will be the same. The air intake valve (23) is a unidirectional diode valve and the pressured air output valve (25) is a controlled valve in which it will get open when the air pressure reaches certain value to let the pressured air into the pressure tank (26) and remains closed all other time. The exhaust opening is set after the air compression valve. When the Rotor (7) moves forward, the ambient air is sucked in and fills the compression chamber, ready to be compressed. The compression and combustion timing is the same as the FIG. 5A except it takes place in 720 degrees.

3—Two Cycle Pump for Air, Fuel, Water and Oil

Referring now to FIG. 4, which is similar for single cycle pump, it could be used with a little modifications for a two cycle air, fuel, water and oil suction and compression in which the input valve (61) and the output valve (65) for any one of the air, fuel, water and oil is a diode valves for a two cycles suction and compression pump for air, fuel, water or oil. An external tank is added for each one of air gas and liquids to store compressed gas or liquid.

In the first cycle, fuel water or oil is sucked in behind the Rotor (7) and in the next cycle, fuel, water or the oil is compressed in front of the Rotor (7) and released through the diode valve (65). The design is the same as FIG. 4 with the same gear driven timing of events as (40) of with the exception that the intake for fuel, water or oil is replaced with unidirectional diode valves of (61) and a unidirectional valve (65) is for the pressured fuel, water or oil.

Figure 6:
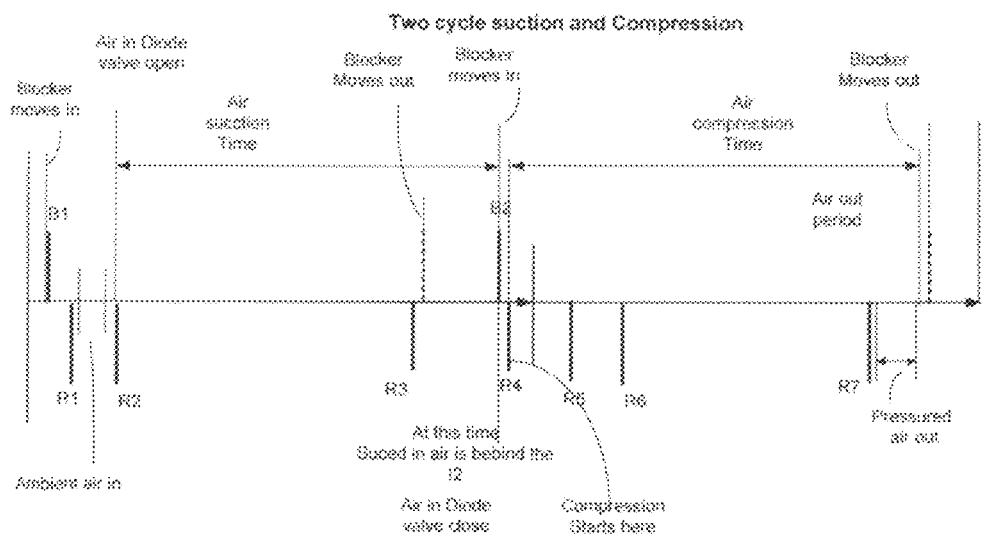
FIG. 6: is the timing schematic of a two cycle suction and compression for the circular suction and compression, one cycle for suction and another cycle for compression.
Figure 8A:
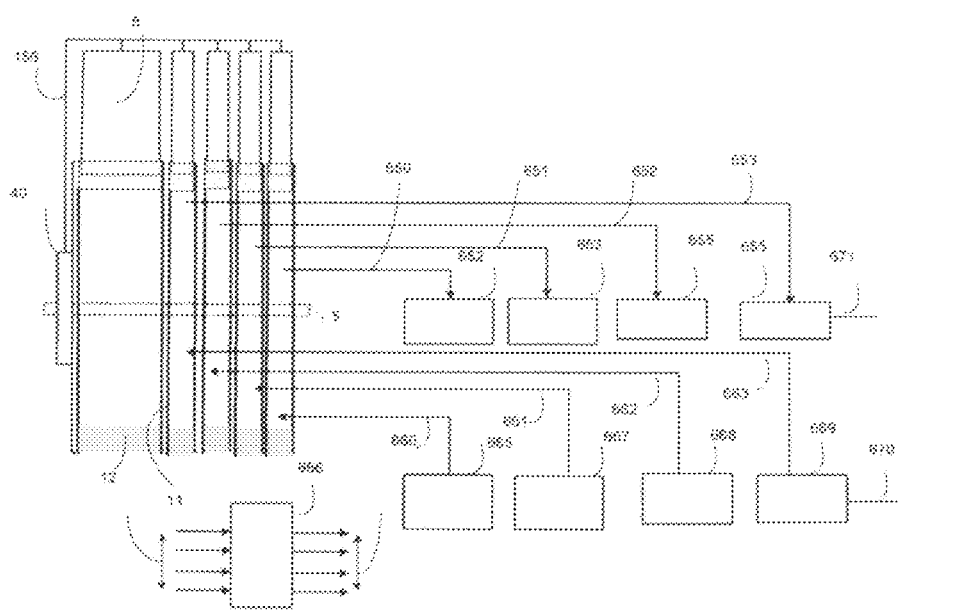
FIG. 8: is the schematic of the electronic timing serving a timing system controller.

Referring now to FIG. 6 for the timing description of two cycles suction and compression pumps for fuel, water or oil. The implementation relates to the second embodiment of combustion and compression pumps in which the suction and compression chamber is formed between the Rotor and the Blocker.

Referring now to FIG. 6A for the implementation of two cycles suction and compression pumps for fuel, water or oil in which a storage tank is shown. The fuel is sucked in from the fuel tank and is pressured and stored in a pressured fuel tank (652), via fuel lines (660) and (650) ready for the fuel injection system. Air, oil and water work the same way.

Figure 6B:
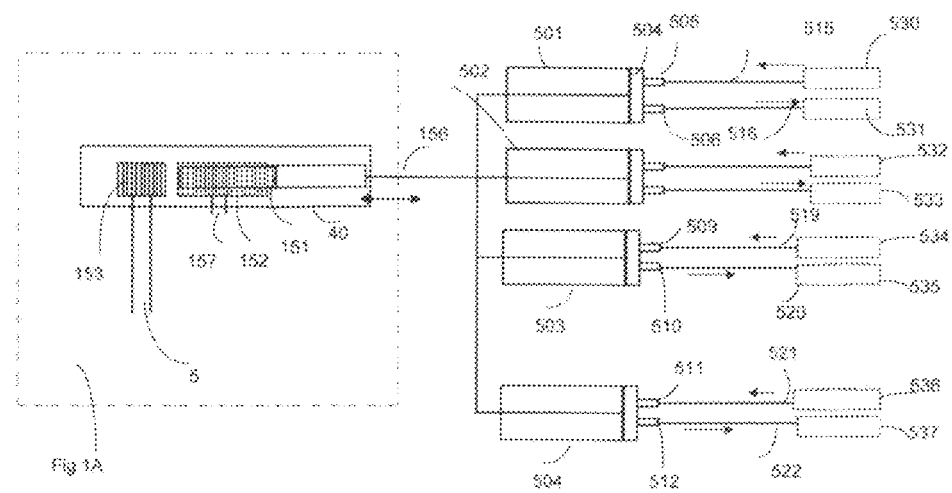
FIG. 6B: is a schematic of single cycle suction and compression pumps utilizing the timed gear assembly timing reciprocating motions for a single cycle air compression and suction.

Referring now to FIG. 6B for the implementation of a single cycle suction and compression pump utilizing the reciprocating motions of timed gear assembly of the embodiment 1, FIG. 1A for providing suction and compression of oil, water, gas and air to serve the complete engine assembly. It consist of a tube (501) in which a piston (504) is activated inside a tube by a rod (156). Upon retraction of the rod, while the diode valve (505) gets opened (because of the creation of the vacuum inside the tube), substances get sucked in form the source (530). In the insertion time period the diode valve (505) gets closed and the diode valve (506) will get open to let the pressured substances out to the destination (531).

Figure 7:
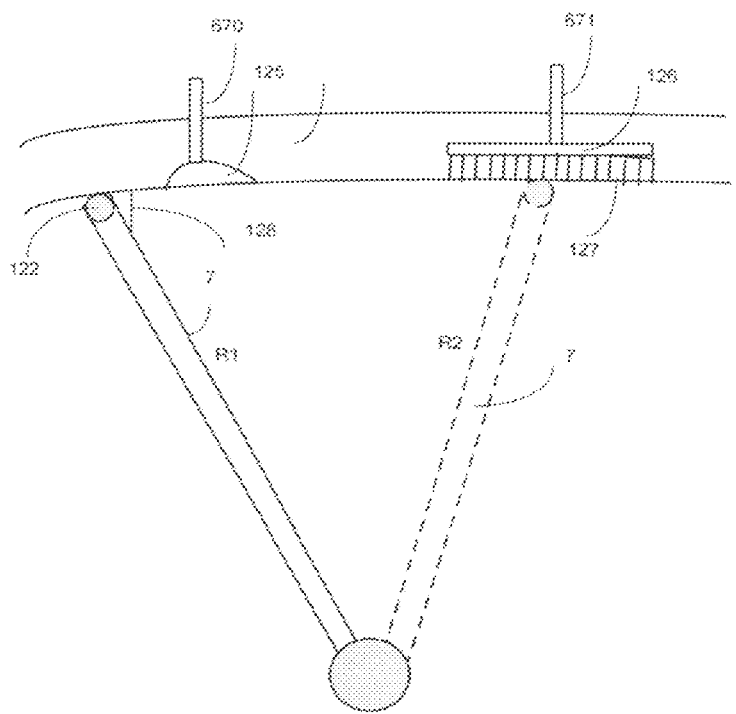
FIG. 7: is the schematic of lubrication methods for the Rotor and the Blocker inside a cavity.

Referring now to FIG. 7, for the description of lubrication system of combustion engine (1) and suction compression pumps (2), (3), (4) and (5) pumps. FIG. 7 relates to a segment of the combustion chamber in which the Blocker (8) is extracted from the inside of the cylinder housing (12) for the Rotor (7) to pass. During this period, the residual oil from previous cycle is collected by a small blade (128), which is connected to (7). It collects the residual oil during the previous combustion cycle. A small cavity (125) drilled in the cylinder housing (12) will allow, the oil to get sucked in by the valve (670). During this period and after the suction, when the Rotor reaches R2, a laminated area of the cylinder (127), id imbedded in cylinder housing (12) for Rotor lubrication cylinder (122), that brushes against the (127). The reservoir (126) previously in the cycle, been supplied by fresh clean oil by valve (671). The reservoir (126) provides the fresh lubricant oil into the (127) for the next cycle. During the combustion period, this oil will lubricate the cylinder wall (12) for lubrication and sealing (isolation) of the combustion chamber. The same lubrication is considered for the other two sides of the Rotor that is in touch with the cover plates (11).

Figure 7A:
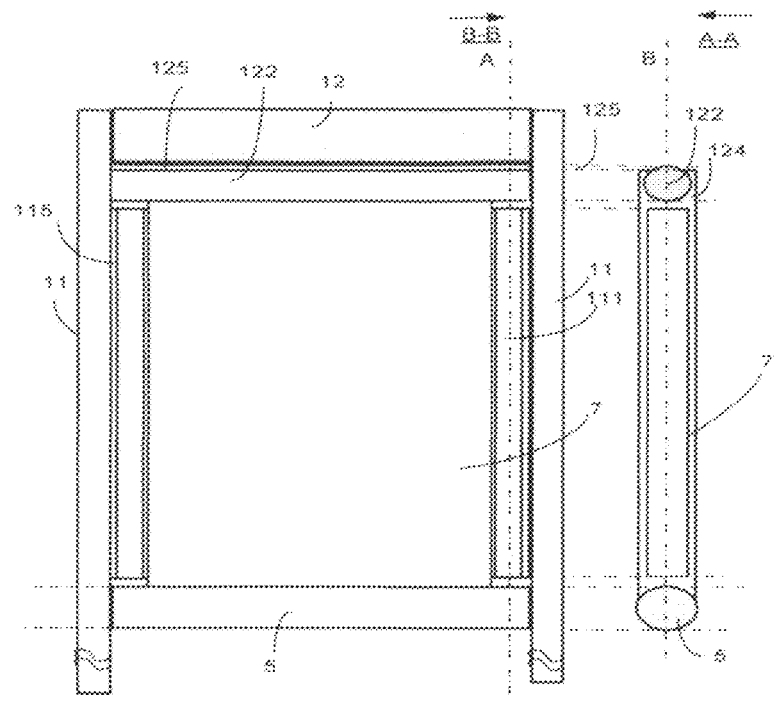
FIG. 7A: is the schematic of lubrication methods for the Rotor and the Blocker inside a cavity.

Referring now to FIG. 7A for further description of lubrication system of combustion engine (1) including suction compression pumps (2), (3), (4) and (5) pumps (Figure B). The corners of Rotor (7) adjacent to the cylinder wall (12) and covering plates (11) is supplied with a small round rods (112) and (111) designed to get supplied with fresh oil and lubricate and seal the combustion and compression chambers. A cylinder shape rods (111) and (112) rotates inside the cavities (125) and (115) while the Rotor (7) is turning. While in rotation, it lubricates the internal walls of the cylinder housing (12) and covering plates (11).

Figure 8:
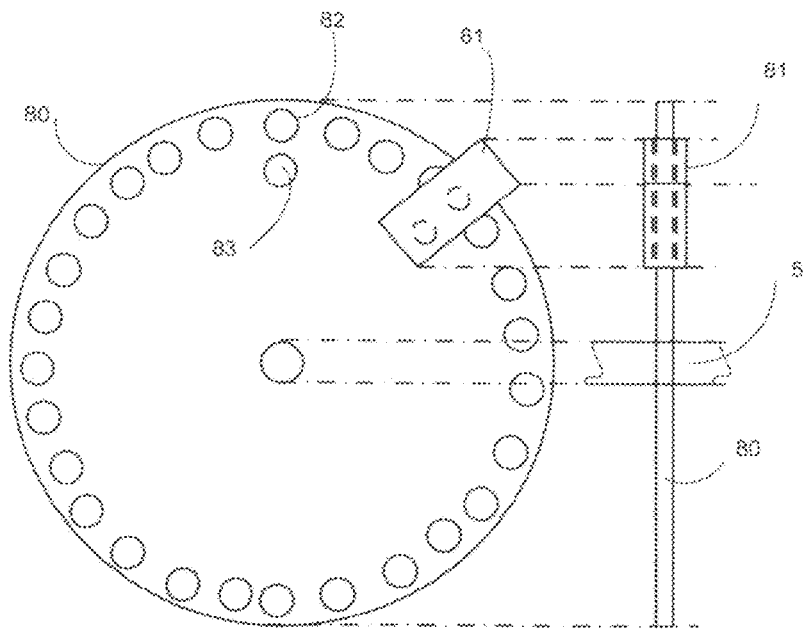

Referring now to FIG. 8, for deriving timing and control signals that are synchronized to the shaft (5). A circular plate (80) is eternally attached to the shat (5) in which the edges of the plate having multiple small openings (82) for timing divisions of a cycle related to the rotation of the shaft and small opening (83) along the circular plate to symbolize an arbitrary time to designate the beginning of a cycle.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

The invention claimed is:

1. A plural blade rotary engine comprising:
   an engine housing having an engine wall with an outer surface and a curved inner surface around hollow cavity within said engine housing;
   a substance intake through said engine wall;
   a substance output through said engine wall;
   said hollow cavity having a central longitudinal axis;
   a rotor shaft located in said hollow cavity along said central longitudinal axis that extends partially outside of said engine housing to make connection with an external gear assembly;

said rotor shaft being rotatable about said central longitudinal axis;
a rotor blade within said hollow cavity attached to said rotor shaft;
a blocker blade providing synchronous momentary motions with respect to the rotation of the rotor blade, in connection with said external gear assembly;
said blocker blade being moveable by said external gear assembly into and out of a stationary blocking position within said hollow cavity in synchronicity with the rotation of said rotor shaft;
an oil collection blade attached to a front surface of said rotor blade;
a lubricator attached to a distal end of said rotor blade;
an oil collection opening in said engine wall;
an oil collection valve connected to said oil collection opening;
a laminated lubricating portion of said curved inner surface;
an oil reservoir in said engine wall in connection with said laminated lubricating portion;
and an oil dispensing valve connected to said oil reservoir.

2. The plural blade rotary engine of claim 1 further comprising a blocker blade opening adjacent to said hollow cavity from which said blocker blade is moved into and out of said stationary blocking position.

3. The plural blade rotary engine of claim 2 wherein said blocker blade is moveable into and out of said stationary blocking position by linear motion through said blocker blade opening.

4. The plural blade rotary engine of claim 2 wherein said blocker blade is moveable into and out of said stationary blocking position by rotating said blocker blade through said blocker blade opening into and out of said stationary blocking position.

5. The plural blade rotary engine of claim 1 further comprising:
said blocker blade being in connection with said external gear assembly through attachment to a hollow rotatable blocker blade shaft that extends from said external gear assembly into said hollow cavity and is concentric with said rotor shaft;
said blocker blade being moveable in synchronicity with the rotation of said rotor shaft into and out of said stationary blocking position by rotation of said blocker blade shaft about said rotor shaft;
a blocker blade stopper in connection with said external gear assembly;
said blocker blade stopper being moveable in synchronicity with the rotation of said rotor shaft into and out of said stationary blocking position to control the rotating movement of said blocker blade past said stationary blocking position.

6. The plural blade rotary engine of claim 1 further comprising:
said substance intake being an air intake;
said substance output being an exhaust output;
a fuel intake through said engine wall; and
an ignition input through said engine wall.

7. The plural blade rotary engine of claim 6 further comprising a blocker blade opening adjacent to said hollow cavity from which said blocker blade is moved into and out of said stationary blocking position.

8. The plural blade rotary engine of claim 7 wherein said blocker blade is moveable into and out of said stationary blocking position by linear motion through said blocker blade opening.

9. The plural blade rotary engine of claim 7 wherein said blocker blade is moveable into and out of said stationary blocking position by rotating said blocker blade through said blocker blade opening into and out of said stationary blocking position.

10. The plural blade rotary engine of claim 6 further comprising:
said blocker blade being in connection with said external gear assembly through attachment to a hollow rotatable blocker blade shaft that extends from said gear assembly into said hollow cavity and is concentric with said rotor shaft;
said blocker blade being moveable in synchronicity with the rotation of said rotor shaft into and out of said stationary blocking position by rotation of said blocker blade shaft about said rotor shaft;
a blocker blade stopper in connection with said gear assembly;
said blocker blade stopper being moveable in synchronicity with the rotation of said rotor shaft into and out of said stationary blocking position to control the rotating movement of said blocker blade past said stationary blocking position.

11. The plural blade rotary engine of claim 6 further comprising said air intake being connected to a compressed air source.

12. The plural blade rotary engine of claim 6 further comprising:
an oil intake through said engine wall;
an oil output through said engine wall;
a coolant space located between said engine housing outer wall and an engine housing cover;
a coolant intake through said engine housing cover into said coolant space; and
a coolant output from said coolant space through said engine housing cover.

13. The plural blade rotary engine of claim 6 further comprising:
a second air intake through said engine wall; and
a compressed air output through said engine wall.

14. The plural blade rotary engine of claim 13 further comprising said compressed air output being connected to a compressed air tank.

15. The plural blade rotary engine of claim 14 further comprising said first air intake being connected to said compressed air tank.

16. A method of generating rotational power from the combustion of a fuel and air using a plural blade rotary engine having an engine housing and a hollow cavity and lubricating the dual blade rotary engine comprising the following steps in a power generating cycle:
positioning a rotor blade and a blocker blade within said hollow cavity so as to divide said hollow cavity into a first variable volume sealed chamber and a second variable volume sealed chamber, the rotor blade motions is in synchronous with the rotor blade, having variable speed phase delayed actions with the rotor blade;
the blocker blade motions is in synchronous with the rotor blade, having variable speed phase delayed actions with the rotor blade,
wherein said first variable volume sealed chamber is located between (i) a front surface of said blocker blade held stationary at a blocking position in said hollow cavity and (ii) a rear surface of said rotor blade which is attached to a rotor shaft rotating about a central longitudinal axis of said hollow cavity such that said rear surface of said rotor blade is moving away from said front surface of said blocker blade,
wherein said second variable volume sealed chamber is located between (i) a front surface of said moving rotor blade and (ii) a rear surface of said blocker blade held stationary at said blocking position;
injecting said fuel into said first variable volume sealed chamber through a fuel intake located in a wall of said engine housing;
injecting said air into said first variable volume sealed chamber through an air intake located in said wall of said engine housing;
combusting in said first variable volume sealed chamber said air and said fuel by introducing a spark into said first variable volume sealed chamber;
evacuating from said first variable volume sealed chamber through an exhaust outlet located in said wall of said engine housing the product of combusting said air and said fuel;
moving said blocker blade away from said blocking position when said rotor blade reaches an end cycle position proximate to said blocking position so that said rotor blade may move past said blocking position; and upon said rotor blade moving past said blocking position returning said blocker blade to said blocking position; and the dual blade rotary engine further includes:
an oil collection blade attached to a front surface of said rotor blade;
a lubricator attached to a distal end of said rotor blade;
an oil collection opening in said engine wall;
an oil collection valve connected to said oil collection opening;
a laminated lubricating portion of said curved inner surface;
an oil reservoir in said engine wall in connection with said laminated lubricating portion;
and an oil dispensing valve connected to said oil reservoir;
where lubricating the dual blade rotary engine comprises of the following steps:
collecting residual oil by the oil collection blade;
sucking the residual oil thru said oil collection opening and said oil collection valve; and
lubricating the rotor blade with clean oil provided from the laminated lubricating portion.

17. A method of pumping a substance using a plural blade rotary engine having engine housing and a hollow cavity containing such substance and lubricating the dual blade rotary engine comprising the following steps in a pumping cycle:
positioning a rotor blade and a blocker blade within said hollow cavity so as to divide said hollow cavity into a first variable volume sealed chamber containing said substance and a second variable volume sealed chamber containing said substance,
wherein said first variable volume sealed chamber is located between (i) a front surface of said blocker blade held stationary at a blocking position in said hollow cavity and (ii) a rear surface of said rotor blade which is attached to a rotor shaft located along a central longitudinal axis of said hollow cavity,
wherein said second variable volume sealed chamber is located between (i) a front surface of said moving rotor blade and (ii) a rear surface of said blocker blade held stationary at said blocking position;
applying a force to said rotor shaft such that said rotor shaft rotates about said central longitudinal axis and said rear surface of said rotor blade is moving away from said front surface of said blocker blade expanding said first variable volume sealed chamber;
suctioning said substance into said first variable volume sealed chamber through a substance intake located in a wall of said engine housing;
expelling said substance under pressure from said second contracting variable volume sealed chamber through a substance output located in said wall of said engine housing;
moving said blocker blade away from said blocking position when said rotor blade reaches an end cycle position proximate to said blocking position so that said rotor blade may move past said blocking position; and returning said blocker blade to said blocking position upon said rotor blade moving past said blocking position;
and the dual blade rotary engine further includes:
an oil collection blade attached to a front surface of said rotor blade;
a lubricator attached to a distal end of said rotor blade;
an oil collection opening in said engine wall;
an oil collection valve connected to said oil collection opening;
a laminated lubricating portion of said curved inner surface;
an oil reservoir in said engine wall in connection with said laminated lubricating portion;
and an oil dispensing valve connected to said oil reservoir;
where lubricating the dual blade rotary engine comprises of the following steps:
collecting residual oil by the oil collection blade;
sucking the residual oil thru said oil collection opening and said oil collection valve; and
lubricating the rotor blade with clean oil provided from the laminated lubricating portion.

* * * * *